United States Patent [19]

Desmarais et al.

[11] Patent Number: 5,167,366
[45] Date of Patent: Dec. 1, 1992

[54] DUCT PRESSURE SYNTHESIS FOR AIR DISTRIBUTION SYSTEM

[75] Inventors: Brett A. Desmarais; Jeffrey S. Gilbert, both of Clay, N.Y.

[73] Assignee: Carrier Corporation, Syracuse, N.Y.

[21] Appl. No.: 676,502

[22] Filed: Mar. 28, 1991

[51] Int. Cl.⁵ .......................... G01L 7/00; F24F 7/00
[52] U.S. Cl. .................................. 236/49.3; 73/700; 73/714
[58] Field of Search .............. 236/49.3, 49.4; 454/73, 454/75; 73/700, 714

[56] References Cited

U.S. PATENT DOCUMENTS

| | | | |
|---|---|---|---|
| 4,591,093 | 5/1986 | Elliott, Jr. ............................ | 236/94 |
| 4,756,474 | 7/1988 | Tulowiecki et al. ................ | 236/49.4 |
| 4,817,864 | 4/1989 | Payne .................................. | 236/49.4 |

Primary Examiner—William E. Wayner

[57] ABSTRACT

An air terminal flow detection scheme in an air distribution system effective for developing static pressure indications of the plenum of the air terminal from change in the flow through the air terminal over the period of time of the change.

5 Claims, 3 Drawing Sheets

DUCT PRESSURE SYNTHESIS FOR AIR DISTRIBUTION SYSTEM

BACKGROUND OF THE INVENTION

This invention relates generally to duct static pressure determination in air distribution systems and more particularly to making such a determination independent of duct pressure sensors.

The utilization of variable air volume (VAV) air distribution systems to supply conditioned air from a central source thereof to offices, school rooms, and other similar spaces or areas in multi-room buildings has become increasingly more prevalent. Such VAV systems generally furnish varying volumes of air, at constant temperatures, into a space in accordance with the space or zone demands. The flow of conditioned air from outlets or terminals is generally regulated by operation of suitable damper means controlled by a thermostat sensing the temperature of the space being conditioned. Thus, as the temperature of the space deviates to a greater degree from a predetermined setpoint, the damper opens more and a greater quantity of conditioned air is discharged into the space. Conversely, when the temperature in the space being conditioned approaches the setpoint, the system decreases the air volume to the space depending upon the deviation of the space temperature from the setpoint. In U.S. Pat. No. 4,756,474 assigned to the same assignee as the present invention, there is described a pneumatic controller for a duct pressure powered air terminal unit having a volume controller which receives two pressure signals, whereby the controller bleeds one pressure signal so as to control the inflation of a bellows or bladder to thereby modulate the terminal unit to maintain a desired volume air flow through the unit, and bleeds the second pressure signal so as to maintain at least a minimum flow through the unit. The above-identified controller is an improvement over U.S. Pat. No. 4,120,453 which describes a three-way valve controller having two pressure regulators and a bleed type thermostat which provide four input signals to the three-way valve thereby providing a single pressure signal to the inflatable bellows.

Since the air terminals in the aforementioned patents are powered by static pressure in the duct and continuously fill and bleed the bladder to maintain a desired space temperature, the static pressure in the duct is continually changing. Further, under normal operating conditions the air terminals closer to the central air source have a high static pressure than air terminals more distant from the central air source. These continually changing duct static pressures make it extremely difficult to maintain proper operation of the air supply system. Conventionally, the statio pressure in the duot is maintained at a predetermined setpoint by a single pressure sensor which is located somewhere in the main duct line. The pressure sensor sends an input to a fan control such as a variable speed drive of an air handler unit to cause the speed to increase, decrease or remain constant as required, and can also send a signal to a control panel or building supervisor. Thus, if the pressure at the sensor location is too high, a "decrease" signal is sent and, if it is too low, and "increase" signal is sent. The location of the sensor is carefully chosen in order that the pressure sensed is most closely representative of the overall system pressure distribution over the whole load range. Ordinarily, the sensor location chosen is about two thirds of the way down the main duct as measured by distance or total pressure drop. So, even if the pressure sensor is located at the point where the sensor will give the "best" representation of the overall duct pressure distribution at design flow, when there is off design flow, or when there is leakage or blockage in the duct, the single sensor provides only a single reading. As a result, the sensor may be inaccurate in its representation of duct pressure distribution under off-design conditions as well as those due to problems in the duct.

Independent of how well placed it is, a single sensor provides a single reading and it is not an average or otherwise influenced by measurements taken at other locations. Because of this, a single reading cannot give a service technician a good view of what is required in the duct under all conditions. Since a full view is not provided, the service technician is required to measure the flow from various terminals or enter the duct to obtain additional pressure readings in order to troubleshoot any duct static pressure problems. Thus there is a clear need for a method and apparatus to determine duct pressure at various locations in the duct system in order to trouble shoot duct static pressure problems without the use of a pressure sensor at each location, but using existing mass air flow sensors associated with air terminals. However, no previously proposed air distribution system has incorporated any means to determine duct pressure at various location without a plurality of pressure sensors at such locations.

SUMMARY OF THE INVENTION

Accordingly, it is an object of the present invention to provide an algorithm for taking information relating to the amount of time to achieve a desired air flow setpoint through and air terminal in a duct whose static pressure varies with flow through the terminal and calculating the rate of change of air flow over the change in time to determine duct pressure.

It is another object of the present invention to provide a damper control means for an air terminal which determines the pressure in the duct at the terminal in relation to the change in flow through the terminal per change in time.

It is a further object of the present invention to provide a remote indication of duct pressure for an air terminal means having a damper mechanism which controls the air flow setpoint of the terminal means as a function duct static pressure.

These and other objects of the present invention are obtained by means of an air terminal control which controls a damper means to achieve an air flow setpoint by determining an amount of time necessary to reach the air flow setpoint as the duct static pressure varies. In the embodiment described the duct pressure is calculated according to the relation:

$$p = Kx\, df/dt$$

where K is a constant of proportionality for a particular size air terminal; and dF is the difference between the initial flow ($F_i$) and the desired flow ($F_d$) through the terminal ; and dt is the time to change between the initial flow ($t_i$) and the desired flow ($F_2$). For example, the air flow through a terminal is accomplished by adjusting the bellows to some inflated state to achieve a desired air flow set point. The time to fill or bleed the bellows is dependent on the duct pressure. The present invention measures the change in air flow through the terminal and divides this change by the calculated fill (or bleed) duration, resulting in a d cfm/$_{dt}$.

The higher the duct static pressure, the faster the bellows fills per unit time, resulting in a larger d cfm/$_{dt}$. The rate of change of flow per time then is used in the algorithm to determine the static pressure in the duct.

BRIEF DESCRIPTION OF THE DRAWINGS

Other objects and advantages of the present invention will be apparent from the following detailed description in conjunction with the accompanying drawings forming a part of the specification in which reference numerals shown in the drawings designate like or corresponding parts throughout the same, and in which.

DESCRIPTION OF THE PREFERRED EMBODIMENT

Figure 1:
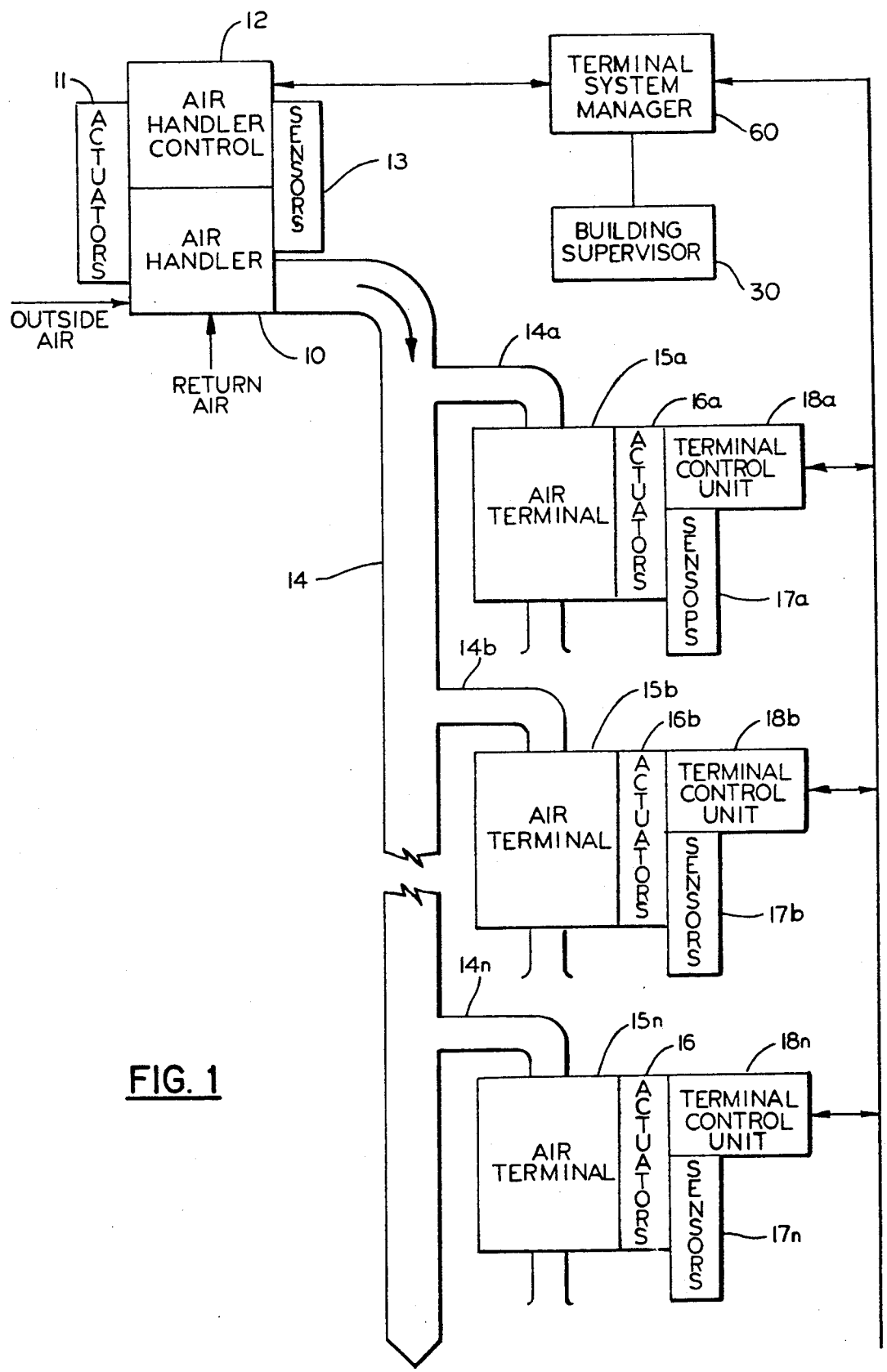
FIG. 1 is a diagrammatic representation of an air system that embodies the principles of the present invention.

In FIG. 1, the numeral 10 generally designates an air source, such as an air handler which includes a fan, coil(s) and an electric or hot water heater. The air handler 10 receives return air and/or outside air which it delivers to duct 14. Actuators 11 control the outside and return air dampers for controlling the amounts of return and/or outside air. The air handler control 12 controls the air handler 10 by controlling the fan speed, coil(s) and heater, as is known. Sensors 13 detect the supply air temperature and fan speed, as measured, for example by the fan motor power. The conditioned air supplied to duct 14 is, in turn, supplied to branch lines 14a–n which supply terminals 15a–n, respectively. Terminals 15a–n may be the inflatable bellows damper type in which plenum air is used to inflate, and thereby close, the bellows and to deflate, and thereby open, the bellows, or of the damper blade type in which an actuator opens and closes the damper blade, or similarly controlled terminals. Actuators 16a–n control the inflation of the bellows or movement of the damper blade or the like as is well known in the art. Sensors 17a–n respectively, sense the space temperature which is supplied to terminal control units 18a–n, respectively. Terminal control units 18a–n contain the logic for controlling the actuators 16a–n based upon the space temperature data supplied by sensors 17a–n and the space temperature setpoint, which may be locally adjusted at the terminal control units 18a–n or remotely at the terminal system manager. Space temperature control is maintained at the setpoint (within a tolerance) through the modulation of air flow through the air terminal. The terminal system manager 60, which may be located outside the space to be conditioned, contains occupancy schedules, temperatures, set points, etc., controls the air handler and terminal control unit and monitors alarms for the entire system. The building supervisor 30, which may also be located outside the conditioned space, provides scheduling, control, and alarm functions for the air distribution system.

Figure 2:
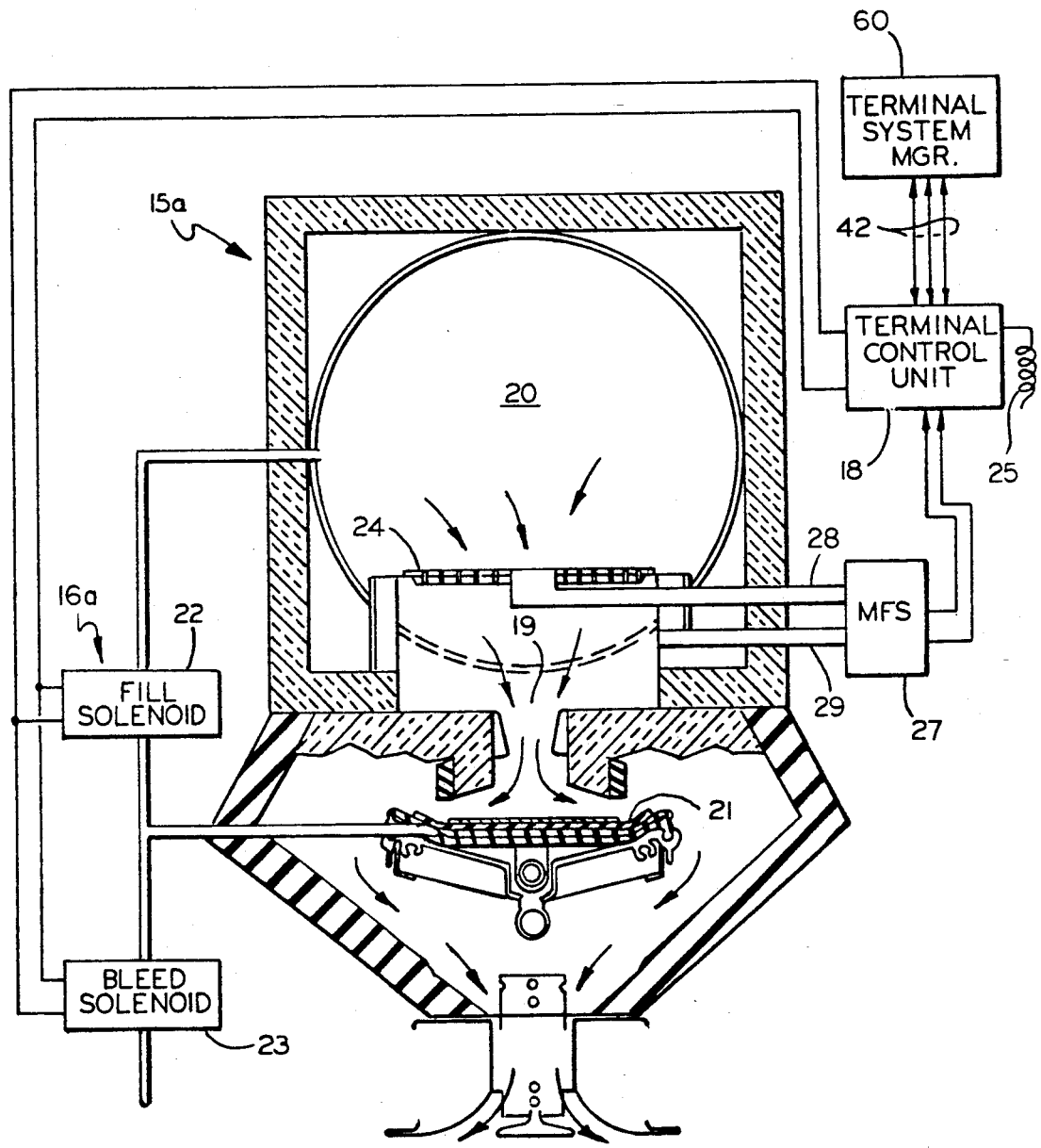
FIG. 2 is a diagrammatic representation of one embodiment of an air damper employing the present invention.

Referring now specifically to FIG. 2 for the details of terminal 15a, line 14a supplies air to plenum 20. Air flows from plenum 20 through supply distribution plate 24 having a plurality of openings therein to low pressure area 19, under the control of bellows 21. High pressure air from plenum 20 is connected by way of line 28 to mass flow sensor (MFS) 27, and low pressure air from below distribution plate 24 also flows, by way of line 29 to mass flow sensor 27. Actuators 16a include fill solenoid 22 which controls the filling or inflation of the bellows and bleed solenoid 23 which controls the bleeding or exhausting of bellows 21, for example, as the bellows 21 is inflated during the fill process, the air flow through the terminal 15 is restricted or decreases and the duct static pressure increases. Sensors 17a includes either integral or remote room temperature sensor 25 and mass air flow sensor 27. The temperature setpoint logic and control is generally included in terminal system manager 60. The terminal control unit 18 would include a conventional power supply and a communications port which, by way of lines 42, would send the room temperature signal to terminal system manager 60 and would receive conservation strategies e.g. night setback, as well as signals for indicating a changeover in response to going between heating and cooling.

Terminal system manager 60 provides data communication to air handler control 12 and terminal control units 18a–n. In this way terminal control units 18a–n are told when to change over to the other logic when changing between heating and cooling, when, and for how long, to open/close the terminals 15a–n, etc. The air handler control 12 further receives information as to how far to reset the coil temperature, whether to change fan speed, etc.

Figure 3:
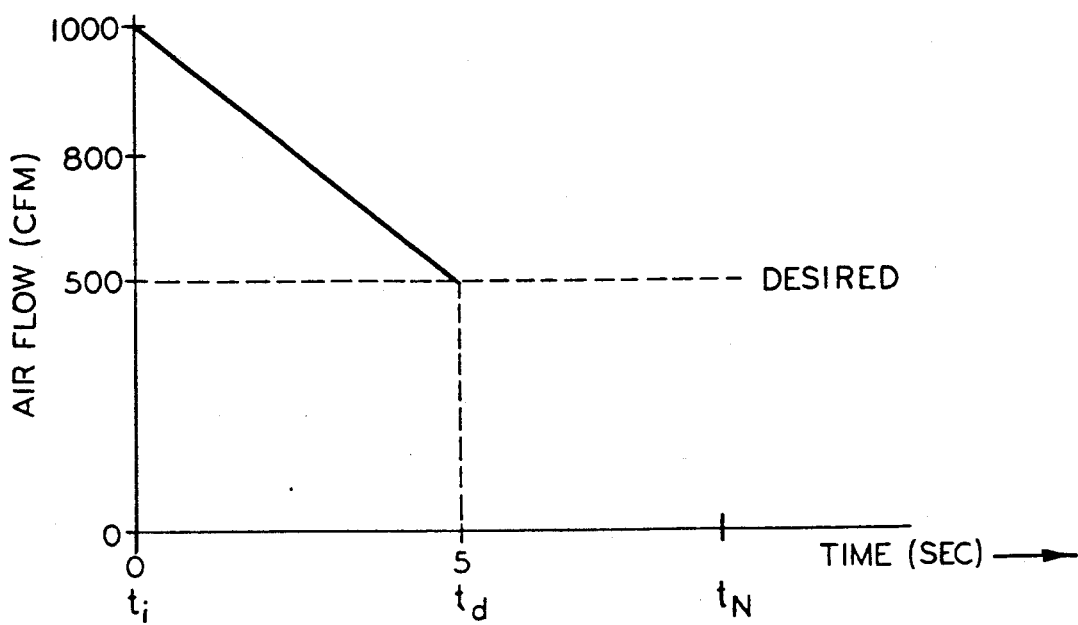
FIG. 3 is a graph showing the relation of the change in air flow to the change in time through an air damper employing the present invention.

FIG. 3 shows the determination of the change in flow through an air terminal over time.

For example, assume that the initial flow is 1000 cfm and the desired flow is 500 cfm. The damper begins to close at an initial time ($t_i$) continues to close until the flow reaches the desires setpoint. The terminal control unit 18 calculates the change in flow (dF) over the change in time ($t_d-t_i$) or dt, i.e. dF/dt=(1000−500)/(5−0)=100 cfm per second. This calculated change in flow per time is converted to duct static pressure and stored in the Terminal System Manager (TSM) 60.

Figure 4:
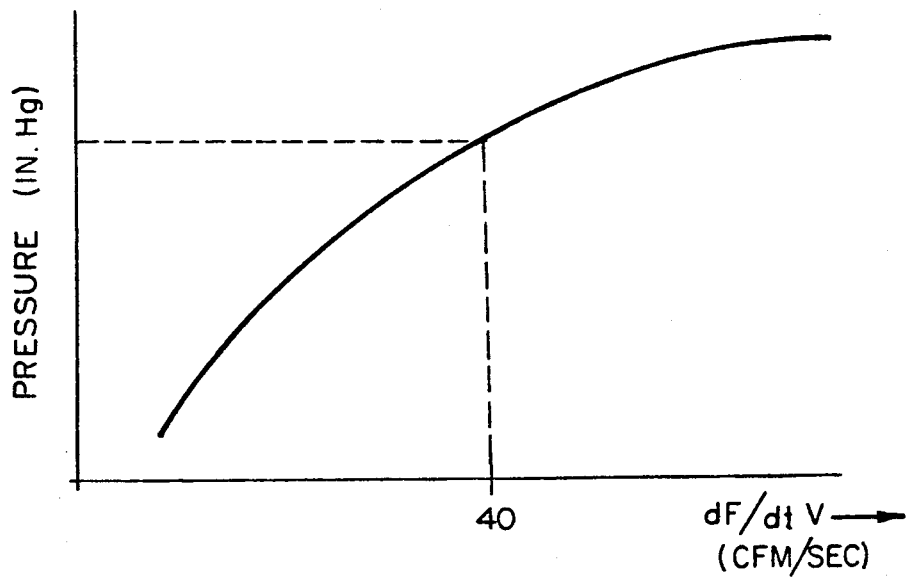
FIG. 4 is a graph showing the relation of pressure in a duct to the change in air flow through a terminal to the change in time for the air flow.

Thus, applicants have recognized that for a dF(cfm)/dt(sec) the duct has a predetermined pressure. Since this predetermined duct pressure is dependent on the physical characteristics of the terminal it is necessary to consider representative empirical data. Accordingly, as shown in FIG. 4, the duct pressure for a Carrier Corporation Model 37C Air Terminal is shown as a function of dF/dt, and is stored in the TSM 60, whereby a building operator or serviceman can determine at the TSM 60, e.g. using and LCD display, the pressure in the duct without using a pressure sensor.

While the invention has been described in detail with reference to the illustrative embodiments, many modifications and variations would present themselves to those skilled in the art.

What is claimed is:

1. An apparatus for determining the static pressure in a plenum of an adjustable air terminal of an air distribution system having at least one adjustable air terminal in the plenum for varying the volume of air into a space, comprising:
- means for sensing the temperature of space;
- means for setting the set point of the desired temperature of the space;
- means for adjusting the air flow through the terminal into the space to a desired air flow $F_d$ responsive to the difference between the sensed temperature in the space and set point for the space whereby said means for adjusting the air flow is dependent upon the static pressure in the plenum for the adjustment;
- means for measuring the initial air flow $F_i$ through the terminal at an initial time $t_i$ and for measuring the time for the air flow through the terminal to reach the desired flow $t_d$; and
- means for converting the measured difference between the desired air flow $F_d$ and the initial air flow $F_i$, and the initial time $t_i$ and the time to reach the desired flow $t_d$ to the static pressure P in the plenum of the air terminal.

2. The apparatus as setforth in claim 1 wherein said converting means employs the relationship $P = K \times dF/dt$, wherein P indicates the air distribution system static pressure, K indicates a constant of proportionality, dF indicates the difference between the desired air flow $F_d$ and the initial air flow $F_i$, and dt indicates the difference betwen the time at the desired flow $t_d$ and the initial time $t_i$.

3. The apparatus as setforth in claim 2 further comprising:
- means for providing an indication of said static pressure from said converting means.

4. A method of determining the static pressure in a plenum of an adjustable air terminal of an air distribution system having at least one adjustable air terminal, the at least one adjustable air terminal having a variable volume adjustment means dependent upon the static pressure in the plenum for varying the volume of air into a space, comprising the steps of:
- determining the actual initial air flow $F_i$ through the terminal at an initial time $t_i$;
- adjusting the air flow through the terminal to a desired air flow $F_d$ in response to a space condition;
- determining the time for the air flow through the temrinal to reach the desired flow $t_d$ from the initial time $t_i$; and
- converting the difference between the determined desired air flow $F_d$ and the actual intial air flow $F_i$, and the initial time $t_i$ and the time to reach the desired flow $t_d$ into a measure of the static pressure P in the plenum of the air terminal.

5. The method of determining the static pressure as setforth in claim 4 wherein the static pressure P is calculated according to the relationship:

$$P = K \times (f_d - F_i)/(t_d - t_i)$$

wherein K is a constant of proportionality of the flow through the adjustable air terminal.

* * * * *